US012625666B2

(12) United States Patent
Gomes et al.

(10) Patent No.: US 12,625,666 B2
(45) Date of Patent: May 12, 2026

(54) SYSTEM AND METHOD FOR PROVIDING SHARED SESSIONS ON A COLLABORATIVE PLATFORM

(71) Applicant: Figma, Inc., San Francisco, CA (US)

(72) Inventors: Avantika Gomes, San Francisco, CA (US); Emily Lin Hasham, San Francisco, CA (US); Jenny Wen, San Francisco, CA (US); Nicolle Matson, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 0 days.

(21) Appl. No.: 18/657,775

(22) Filed: May 7, 2024

(65) Prior Publication Data

US 2024/0370219 A1    Nov. 7, 2024

Related U.S. Application Data

(60) Provisional application No. 63/464,627, filed on May 7, 2023.

(51) Int. Cl.
*G06F 3/14* (2006.01)

(52) U.S. Cl.
CPC .................................. *G06F 3/1454* (2013.01)

(58) Field of Classification Search
CPC ...................................................... G06F 3/1454
See application file for complete search history.

(56) References Cited

U.S. PATENT DOCUMENTS

| | | | |
|---|---|---|---|
| 5,339,389 A | 8/1994 | Bates et al. | |
| 6,088,709 A | 7/2000 | Watanabe | |
| 7,536,653 B2 | 5/2009 | Badovinac | |
| 7,770,122 B1 | 8/2010 | Shaik | |
| D687,062 S | 7/2013 | Gardner | |
| D689,091 S | 9/2013 | Impas | |
| 8,533,580 B1 | 9/2013 | Xu | |
| D693,365 S | 11/2013 | Gardner | |
| D706,826 S | 6/2014 | McLean | |
| D745,046 S | 12/2015 | Shin | |
| D755,225 S | 5/2016 | Kim | |
| 9,424,545 B1 | 8/2016 | Lee | |
| 9,477,649 B1 | 10/2016 | Davidson | |
| D774,044 S | 12/2016 | Ouihet | |
| D789,391 S | 6/2017 | Cabrera, Jr. | |
| D820,311 S | 6/2018 | Cabrera, Jr. | |

(Continued)

FOREIGN PATENT DOCUMENTS

| | | |
|---|---|---|
| KR | 20210142839 A | 11/2021 |
| WO | 2019209391 A1 | 10/2019 |

OTHER PUBLICATIONS

International Search Report and Written Opinion mailed Jun. 27, 2023 in PCT/US2023/015322.

(Continued)

*Primary Examiner* — Christopher E Leiby

(74) *Attorney, Agent, or Firm* — Squire Patton Boggs LLP; Sarah Mirza

(57) ABSTRACT

Examples enable a shared session for a collaborative platform where a user can elect to become a presenter of a shared session where the user can share their view state of a shared content of the collaborative platform. The recipients of the shared session can participate without navigating away or leaving the collaborative platform.

20 Claims, 9 Drawing Sheets

(56) References Cited

U.S. PATENT DOCUMENTS

| 10,129,188 | B2 | 11/2018 | Liu |
|---|---|---|---|
| 11,010,542 | B2 | 5/2021 | Nelson |
| D925,597 | S | 7/2021 | Chandran |
| D1,009,905 | S | 1/2024 | Park |
| D1,017,629 | S | 3/2024 | Park |
| 2004/0005627 | A1 | 1/2004 | Chen |
| 2004/0054627 | A1 | 3/2004 | Rutledge |
| 2007/0118794 | A1 | 5/2007 | Hollander |
| 2010/0037149 | A1 | 2/2010 | Heath |
| 2011/0047532 | A1 | 2/2011 | Wang |
| 2013/0013089 | A1 | 1/2013 | Kawakami |
| 2013/0014023 | A1 | 1/2013 | Lee |
| 2013/0031208 | A1 | 1/2013 | Linton |
| 2013/0097476 | A1 | 4/2013 | Koroda |
| 2013/0124967 | A1 | 5/2013 | Hatfield |
| 2014/0040833 | A1 | 2/2014 | McLean |
| 2014/0108963 | A1 | 4/2014 | Black |
| 2014/0258968 | A1 | 9/2014 | Brown |
| 2014/0298153 | A1 | 10/2014 | Tsujimoto |
| 2015/0032366 | A1 | 1/2015 | Man |
| 2015/0302338 | A1 | 10/2015 | Zaveri |
| 2016/0110063 | A1 | 4/2016 | Connolly |
| 2016/0232785 | A1 | 8/2016 | Wang |
| 2016/0277341 | A1 | 9/2016 | Garen |
| 2016/0343156 | A1 | 11/2016 | Yoshizawa |
| 2016/0358467 | A1 | 12/2016 | Jeong |
| 2017/0192656 | A1 | 7/2017 | Pedrick et al. |
| 2017/0293544 | A1 | 10/2017 | Katayama |
| 2018/0053227 | A1 | 2/2018 | Camhi |
| 2018/0121039 | A1 | 5/2018 | Bliss |
| 2018/0173701 | A1 | 6/2018 | Kim |
| 2018/0174446 | A1 | 6/2018 | Wang |
| 2018/0181299 | A1 | 6/2018 | Ouollette et al. |
| 2018/0234738 | A1 | 8/2018 | Sarkar |
| 2018/0315248 | A1 | 11/2018 | Bastov |
| 2018/0337880 | A1 | 11/2018 | Sokolov |
| 2018/0350144 | A1 | 12/2018 | Rathod |
| 2019/0129927 | A1 | 5/2019 | Okamoto |
| 2019/0361580 | A1 | 11/2019 | Dowling et al. |
| 2020/0296147 | A1* | 9/2020 | Eliason ................. H04L 65/403 |
| 2020/0396569 | A1* | 12/2020 | Shekhar .............. H04L 67/1046 |
| 2021/0099762 | A1 | 4/2021 | Bernstein |
| 2021/0367986 | A1 | 11/2021 | Davuluri et al. |
| 2022/0191594 | A1 | 6/2022 | Devoy, III |
| 2023/0370507 | A1* | 11/2023 | Chang ................... G06F 3/0482 |
| 2024/0054627 | A1 | 2/2024 | Song |

OTHER PUBLICATIONS

Paper by WeTransfer—Simple Sketch App, "Creativity at your fingertips" URL:https://web.archive.org/web/20220121205009/https://wetransfer.com/paper, 9 pages.

Batman_in_Peacetime, So I've Been Trying "Theming" from the Developer Options, posted Jan. 15, 2020 (online), Retrieved from the internet Oct. 17, 2024, https://reddit.com/r/galaxys10/commenst/epda08/so_ive_been_trying_theming_from_the_developer/ (Year: 2020).

Bugsster, Color Picker Vector Icon, posted Sep. 19, 2017 (online), Retrieved from the Internet Oct. 17, 2024, https://www.shutterstock.com/image-vector/color-picker-vector-icon-718760203 (Year: 2017).

Gerardo Orlandin, Flat Tear Drop Mette a Disposizione Oltre 1800 Icone Minimalo Dalla Forma a Larci, posted Nov. 20, 2019 (online), Retrieved from the internet Oct. 17, 2024, https://tuttoandroid.net/applacizioni/flat-teardrop-icon-pack-pacchetto-icone-752251/ (Year: 2019).

Inko9nito, Quark vs Scottish Arts Council, posted Oct. 16, 2007 (online), Retrieved from the Internet Sep. 18, 2024, https://inko9nito.wordpress.com/2007/10/16/quark-vs-scottish-arts-counbcil/ (Year: 2007).

International Search Report and the Written Opinion of the International Searching Authority mailed Mar. 1, 2023 for related PCT/US2022/050134 filed Nov. 16, 2022, 10 pages.

IPRP mailed May 31, 2024 in PCT/US2022/050134.

Kevin Rabida, 9 Generic Logotypes You Should Avoid When Designing a Logo, posted Mar. 26, 2015 (online), Retrieved from the internet Oct. 17, 2024, https://ucreative.com/articles/9-generic-logotypes-you-should-avoid-when-designing-a-logo/ (Year: 2015).

Purlo Punk, Chat Teardrop Icon, posted Dec. 2, 2021 (online), Retrieved from the internet Oct. 17, 2024, https://shutterstock.com/image-vector/chat-teardrop-icon-thin-light-regular-2085261703 (Year: 2021).

Robert Bye, Launched! Feature: Comments, posted Sep. 2022 (online), Retrieved from internet Oct. 17, 2024, https://forum.figma.com/t/launched-feature-comments/3737/21 (Year: 2022).

* cited by examiner

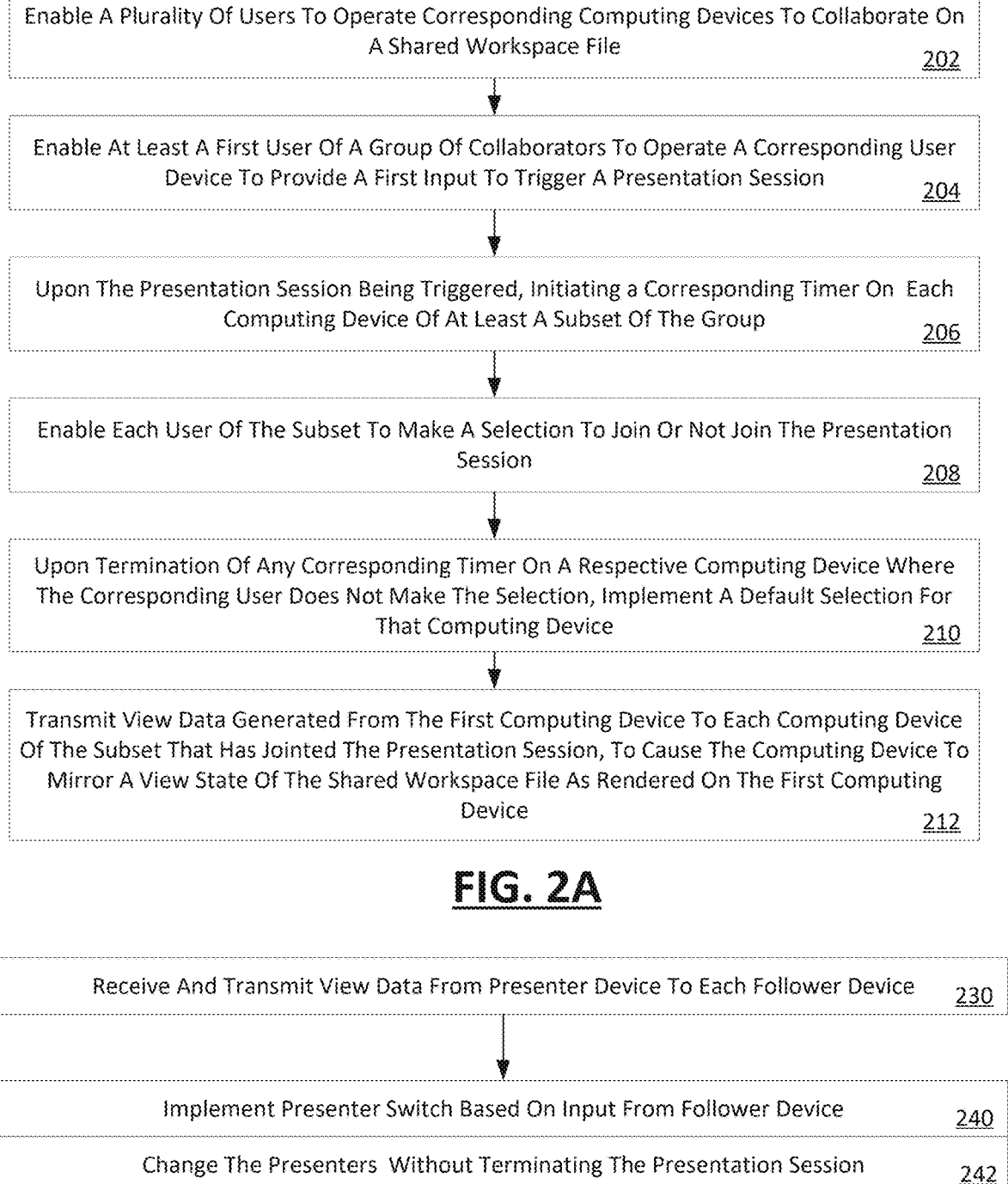

Enable A Plurality Of Users To Operate Corresponding Computing Devices To Collaborate On A Shared Workspace File                                                                                    202

Enable At Least A First User Of A Group Of Collaborators To Operate A Corresponding User Device To Provide A First Input To Trigger A Presentation Session                                          204

Upon The Presentation Session Being Triggered, Initiating a Corresponding Timer On Each Computing Device Of At Least A Subset Of The Group                                                         206

Enable Each User Of The Subset To Make A Selection To Join Or Not Join The Presentation Session                                                                                                    208

Upon Termination Of Any Corresponding Timer On A Respective Computing Device Where The Corresponding User Does Not Make The Selection, Implement A Default Selection For That Computing Device      210

Transmit View Data Generated From The First Computing Device To Each Computing Device Of The Subset That Has Jointed The Presentation Session, To Cause The Computing Device To Mirror A View State Of The Shared Workspace File As Rendered On The First Computing Device                                                                                                                   212

FIG. 2A

Receive And Transmit View Data From Presenter Device To Each Follower Device          230

Implement Presenter Switch Based On Input From Follower Device                         240

Change The Presenters Without Terminating The Presentation Session                     242

But since then, a lot has happened and
we've had some learnings...

410

400

But since then, a lot has happened and
we've had some learnings...

SYSTEM AND METHOD FOR PROVIDING SHARED SESSIONS ON A COLLABORATIVE PLATFORM

RELATED APPLICATIONS

This application claims benefit of priority to Provisional U.S. Patent Application No. 63/464,627, filed May 7, 2023; the aforementioned priority application being hereby incorporated by reference in its entirety.

TECHNICAL FIELD

Examples described herein relate to a collaborative platform, and more specifically, a system and method for providing shared sessions on a collaborative platform.

BACKGROUND

Software design tools have many forms and applications. In the realm of application user interfaces, for example, software design tools require designers to blend functional aspects of a program with aesthetics and even legal requirements, resulting in a collection of pages which form the user interface of a software application product. Product designers and developers who collaborate on projects, including product design projects, often find it challenging to track and share product development progress, in addition to other changing objectives and requirements as a product design project evolves. Synchronous meetings can bring myriad cross-functional voices into the design process and help teams develop and refine ideas together. During such live collaborative sessions, designers are looking for ways to ensure their collaborators are focused on the right parts of their work product content and files. They may desire ways to review their designs in a more timely, collaborative and focused manner, with the ability to call their attention to, or direct their members of their collaborative group to, a specific part of workspace files in order to share progress, context and to update project and product requirements as well as instructions related thereto.

BRIEF DESCRIPTION OF THE DRAWINGS

FIG. 2A illustrate an example method for initiating a shared session on collaborative platform, according to one or more embodiments.

FIG. 2B illustrates an example method for implementing a shared session for a group of computing devices, according to one or more embodiments.

DETAILED DESCRIPTION

Figure 1:
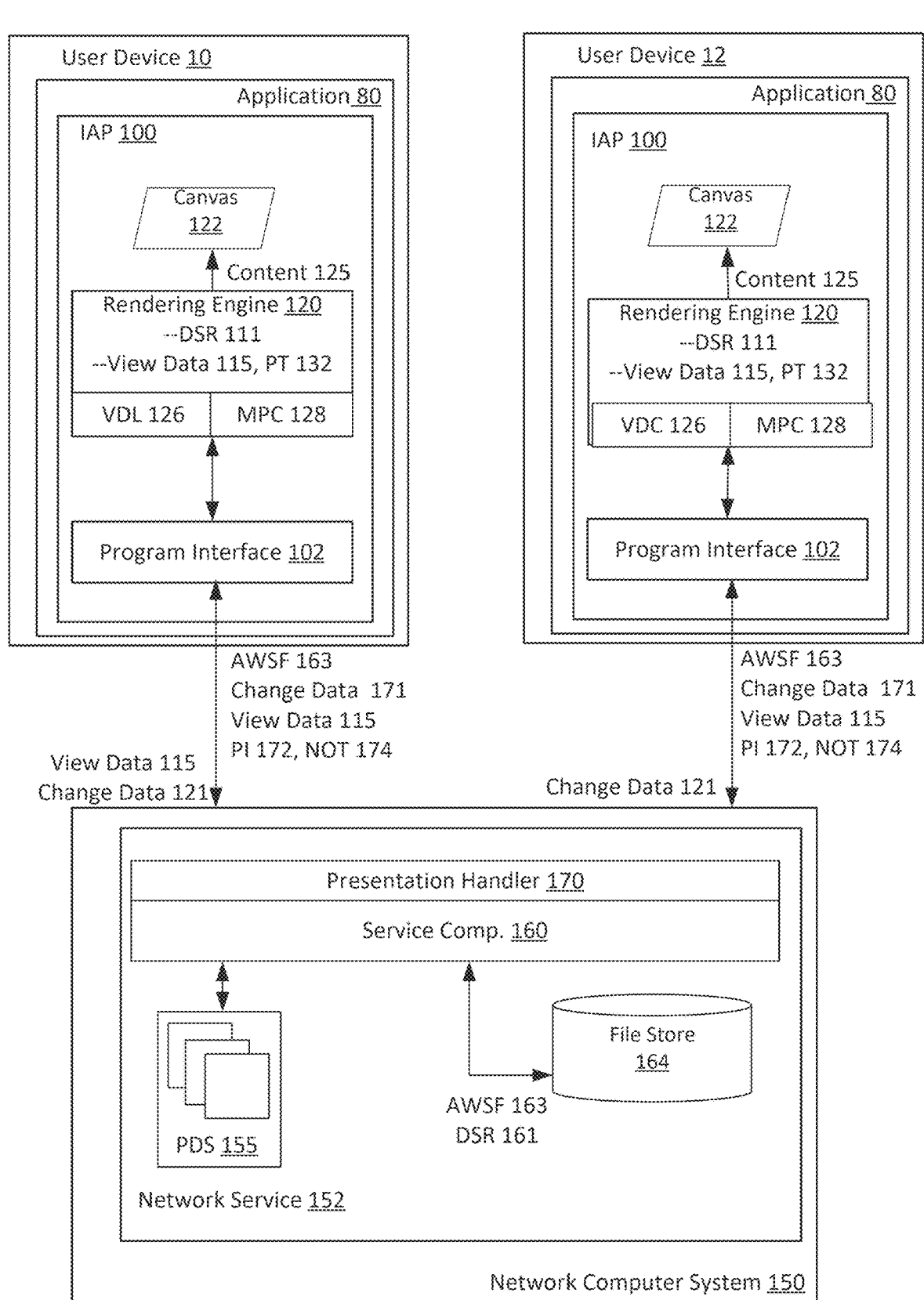
FIG. 1 illustrates a collaborative platform for initiating shared sessions, according to one or more embodiments.

Embodiments herein enable user devices interconnected within a collaborative platform in a network computing system to facilitate workshops, meetings, and team exercises in accordance with a shared canvas. Embodiments allow a particular collaborator (referred to herein as a presenter) within a group of collaborators, to initiate gathering others in the group of collaborators to "follow" their view of a shared canvas that relates to a collaborative project undertaken. The presenter can be designated as such upon requesting other collaborators in a product design file, for instance, to follow the presenter around a shared canvas. In examples, the shared canvas can render a portion of a design file generated with a design application. In variations, the shared canvas can render other types of content, such as content generated through use of a collaborative a whiteboarding application, graphic design application (e.g., for use in creating slides), or coding file. Typically, among a group of collaborators across a networked computing system, simply screen-sharing content among collaborators, as is common, can present significant communication and continuity challenges. Design files, for example, can be intricate and complex, where communication about specific elements or aspects becomes difficult to reference with particularity. Through examples as described, a presenter is able to focus a user to specific aspects of a shared canvas, to, for example, (i) demonstrate steps for creating or editing attributes of a shared design; (ii) communicate verbally (e.g., through a shared or associated audio channels) or through text about specific aspects of the shared design; and/or (iii) gather collaborators for an online group meeting regarding or pertaining to content rendered from a workspace file (e.g., whiteboarding application, graphic design application, etc.).

According to some examples, a network computer system enables collaborators to follow a presenter who navigates, in real time, a given work-space or file. Upon initiation of a shared session, the network computer system synchronizes the view of collaborators to be the same as the view of the presenter. Accordingly, if the presenter makes changes to their view of the shared canvas, the network computer system detects the changes and then propagates those changes to the view of the followers operating their own respective computing device. In this way, some examples provide for collaborators to have the same view as the presenter.

In embodiments, the shared view presented to the user computing devices of followers mirrors the presenter's location on a shared canvas. Additionally, in variations, the shared view presented to followers can mirror the scaling or magnification level (sometimes referred to as "zoom level") of the presenter. Thus, the presenter can select the zoom level for presenting to followers.

Further, in some variations, the presenter can select which layers of a shared canvas are to be viewed, such that elements of non-selected layers are not viewable on the computing devices of the presenter and followers. Still further, in some examples, the presenter can continuously make changes to the content of the shared canvas, zoom level, layer selection and/or other aspect of the presenter's view, and the change to the presenter's view is automatically propagated to other collaborator devices that are following the presentation.

According to examples, a network computer system enables shared sessions to be initiated amongst collaborators of a workspace file. The shared session can be initiated by a collaborator who wishes to present information by way of showing other collaborators the presenter's view of a rendered workspace file. As described by examples, a collaborator working on a shared workspace file with other collaborators can initiate a shared session where he or she can share his view of the rendered workspace file, for purpose of sharing information with other collaborators. The shared session can further be equipped with audio or other media that allows the presenter to speak with the other collaborators while other collaborators view the workspace file on the respective devices. Through the shared session, the presenter can quickly and efficiently convey information that is pertinent to the shared workspace file.

Examples recognize that while other collaborators may also be viewing a shared workspace file, each collaborator may be focused on a particular location, section, page or other portion of the rendered workspace file. Further, in graphic design applications, for example, the rendered workspace file may be considerably detailed, with the design aspects that can only be viewed at high magnification levels. Thus, not only may collaborators focus on different portions of a workspace file, but collaborators may also work on the shared workspace file at different magnification levels, based on the granularity required by, for example, the task they are performing. Further, the rendered workspace file may include multiple layers, and the content rendered for each collaborator can vary based on the layers they have selected. In this context, the collaborator who elects to present can select the magnification level, content layers or other aspects of the rendered workspace file to show one other collaborator's devices.

Additionally, examples recognize that in a collaborative environment where multiple collaborators are, for example, editing and updating a shared workspace file, shared sessions may be desirable when arranged in an ad hoc manner. Moreover, in graphic applications such as graphic design or whiteboarding applications, collaborators focus their attention on a particular region of the canvas. If the user's attention is drawn away from the canvas, such as in the case where they may want to use a keyboard to text-chat with the other collaborators, certain inefficiencies develop with respect to, for example, the amount of time it may take for the user to communicate information that is being graphically rendered, as well as with respect to the ability of the user to find their location of focus on the shared canvas.

In examples, the collaborative environment provides for a set of presentation tools that allow for collaborators to initiate and participate in ad hoc shared sessions, without taking the participants away from the particular location of their respective focus. The set of presentation tools can be provided as a functional layer that persistently overlays the view of the collaborators, allowing individual collaborators to select to present with the click of a mouse. Other collaborators may then receive an on-canvas notification that invites them to join a shared session. For example, the on canvas notification can be interactive and overlay the particular collaborator's view of the canvas, such that the recipient of the notification can elect to join or not join the shared session.

In additional examples, the network computer system can implement a default action where invited collaborators can take no action in order to join the shared session. The notification generated in response to a collaborator initiating a shared session can simply allow the collaborator to click on a soft button (e.g., "cancel") to decline joining the shared session. In additional examples, in response to a collaborator initiating a shared session, other collaborators who are invited to join the shared session can elect to do so by taking to action for a predetermined interval of time. Further, in examples, once a collaborator initiates a shared session, the computing devices of other collaborators who are invited to participate in the shared session can be provided a timer under which the recipient collaborator can elect to take no action to join the shared session. Once the recipient collaborator joins a shared session, their view of the shared workspace file may be changed to mirror that of the presenter.

According to some examples, a network computer system enables collaborators to follow a presenter who navigates, in real time, a given work-space or file. Upon initiation of a shared session, the network computer system synchronizes the view of collaborators to be the same as the view of the presenter. Accordingly, if the presenter makes changes to their view of the shared canvas, the network computer system detects the changes and then propagates those changes to the view of the followers operating their own respective computing device. In this way, some examples provide for collaborators to have the same view as the presenter. In embodiments, the shared view presented to the user computing devices of followers is synchronized to mirror the presenter's view. Thus, when the shared session is started, the presenter's canvas location and zoom level are mirrored on the other computing devices that are participating in the shared session. Likewise, as the presenting user navigates his or her canvas location and/or zoom level during the shared session, the canvas location and/or zoom level of the other participating computing devices is also updated to mirror that of the presenting user. In this way, the user can select the canvas location and magnification level for the shared session.

Further, in some variations, the presenter can select which layers of a shared canvas are to be viewed, such that elements of non-selected layers are not viewable on the computing devices of the presenter and followers. Still further, in some examples, the presenter can continuously make changes to the content of the shared canvas, zoom level, layer selection and/or other aspect of the presenter's view, and the change to the presenter's view is automatically propagated to the views of the followers.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates a network computing system to implement an interactive application platform ("IAP") 100 for multiple users in a collaborative platform environment according to one or more embodiments. A network computing system such as described with an example of FIG. 1 can be implemented using one or more server computing devices which communicate with user computing devices over one or more networks. In examples, the collaborative platform environment includes network computing system 150 that performs operations to enable an interactive application platform ("IAP 100") to be implemented on user computing devices 10, 12. In examples, the IAP 100 provides, or otherwise enables a user's computing device to utilize one or more application services, where each application service provides a particular type of application functionality. By way of example, the application service(s) include (i) an interactive graphic application service, to enable users to create and share dynamic and interactive designs, including designs that can be prototyped or imported to a run-time environment, for example in accordance with a run-time simulation engine; (ii) a whiteboarding application service, to enable users to create and share visual content to share ideas with other users; (iii) a code creation application service to enable code creation and representation based on graphical and/or textual input; (iv) a presentation application service to enable users to create and share presentations (e.g., slides); (v) a word processing application service; and/or (vi) an application to enable users to create and share one or more types of structured data sets (e.g., database, spreadsheet, table, etc.). Accordingly, each application service can provide functionality and configurations that are separate from the other application service(s). Alternatively, the application services can be implemented as modes of one another. For example, the presentation application can be implemented as a mode of the interactive graphic design application, whiteboarding application, presentation application, or other collaborative content. Further, each application service can be provided from a common source (e.g., website), and share a common set of resources, such as a common framework, utilities, user-interface and/or functional features and elements.

The network computing system 150 can implement the collaborative environment using the IAP 100, with respect to a workspace file that is shared amongst a group of collaborators. In the collaborative environment, each collaborator refers to a user that accesses the shared workspace file at the same time as other users. In the context of a collaborative platform or environment, users can access a shared workspace file by accessing a local version or copy of the workspace file, where each local version or copy of the workspace file is maintained in synch (or continuously synchronized). Further, as collaborators, each user can edit and update the shared workspace file, such that changes made by one collaborator are propagated or otherwise synchronized in real-time (or near real-time) to other users. In this way, each collaborator views and edits a fully updated and current version of the workspace file, with changes from other users being present. In some examples, the type of workspace file can include a graphic design file for a graphic design application or whiteboarding application, where graphic content is rendered and updated on a shared canvas. While numerous examples are described in context of a shared canvas for a graphic application, in variations, examples can be implemented for other types of collaborative applications, where the type of workspace file can include, for example, a presentation file (e.g., slides or slide deck), text file (e.g., .txt, .doc., etc.) for a code creation application or word processing application.

According to examples, the IAP 100 can be implemented on a user computing device 10 to enable a corresponding user to utilize one of multiple application services in a network or collaborative environment. Each design application can include resources and instructions to enable the user to access, update and/or create a corresponding workspace file. In particular, the IAP 100 can utilize a digital canvas 122 on which a workspace file is rendered as user-created content 125, and the user can edit the content 125 to update the workspace file. The canvas 122 can provide a provide a reference frame that defines spacing and size of content elements of rendered content relative to one another, as well as a reference for magnification level.

Still further, in some examples, the IAP 100 executes on each user computing device 10 as a multi-modal web-based application, with each mode corresponding to one of multiple application services that are provided through a network service provided by the network computing system 150. The IAP 100 can operate in either of multiple modes to render the workspace file (e.g., as content 125) and to update the workspace file using the application service of the mode in use.

According to examples, a user of computing device 10 operates web-based application 80 to access a network site, where programmatic resources are retrieved and executed to implement the IAP 100. The web-based application 80 can execute scripts, code and/or other logic (the "programmatic components") to implement functionality of one or more application services provided by the IAP 100. In examples, the web-based application 80 can correspond to a commercially available browser, such as GOOGLE CHROME (developed by GOOGLE, INC.), SAFARI (developed by APPLE, INC.), and INTERNET EXPLORER (developed by the MICROSOFT CORPORATION). In such examples, the processes of the IAP 100 can be implemented as scripts and/or other embedded code which web-based application 80 downloads from a network site. For example, the web-based application 80 can execute code that is embedded within a webpage to implement processes of the IAP 100. The web-based application 80 can also execute the scripts to retrieve other scripts and programmatic resources (e.g., libraries) from the network site and/or other local or remote locations. By way of example, the web-based application 80 may execute JAVASCRIPT embedded in an HTML resource (e.g., web-page structured in accordance with HTML 5.0 or other versions, as provided under standards published by W3C or WHATWG consortiums). In some examples, the rendering engine 120 may utilize graphics processing unit (GPU) accelerated logic, such as provided through WebGL (Web Graphics Library) programs which execute Graphics Library Shader Language (GLSL) programs that execute on GPUs.

The IAP 100 can be implemented as part of a network service, where web-based application 80 communicates with one or more remote computers (e.g., server used for a network service) to executes processes of the IAP 100. The web-based application 80 retrieves some or all of the programmatic resources for implementing the IAP 100 from a network site. The web-based application 80 may also access various types of data sets in providing the IAP 100. The data sets can correspond to files and design libraries (e.g., pre-designed design elements), which can be stored remotely (e.g., on a server, in association with an account) or locally. In examples, the network computer system 150 provides a shared design library which the user computing device 10 can use with either application service. In this way, the user may initiate a session to implement the IAP 100 for purpose of creating or editing the workspace file, as rendered on the canvas 122, in accordance with one of multiple application services of the IAP 100.

In examples, the IAP 100 includes a program interface 102, an input interface 118 and a rendering engine 120. The program interface 102 can include one or more processes which execute to access and retrieve programmatic resources from local and/or remote sources. In an implementation, the program interface 102 can generate, for example, a canvas 122, using programmatic resources which are associated with web-based application 80 (e.g., HTML 5.0 canvas). As an addition or variation, the program interface 102 can trigger or otherwise cause the canvas 122 to be generated using programmatic resources and data sets (e.g., canvas parameters) which are retrieved from local (e.g., memory) or remote sources (e.g., from network service).

The program interface 102 may also retrieve programmatic resources that include an application framework for use with canvas 122. The application framework can include data sets which define or configure, for example, a set of interactive tools that integrate with the canvas 122. In examples, the set of interactive tools can include graphic tools that enable a user to create one or multiple types of graphical content (e.g., graphic design interface and/or whiteboard design or content, etc.).

According to some examples, the input interface 118 can be implemented as a functional layer that is integrated with the canvas 122 to detect and interpret user input. The input interface 118 can, for example, use a reference of the canvas 122 to identify a screen location of a user input (e.g., 'click'). Additionally, the input interface 118 can interpret an input action of the user based on the location of the detected input (e.g., whether the position of the input indicates selection of a tool, an object rendered on the canvas, or region of the canvas), the frequency of the detected input in a given time period (e.g., double-click), and/or the start and end position of an input or series of inputs (e.g., start and end position of a click and drag), as well as various other input types which the user can specify (e.g., right-click, screen-tap, etc.) through one or more input devices. In this manner, the input interface 118 can interpret, for example, a series of inputs as a design tool selection (e.g., shape selection based on location of input), as well as inputs to define attributes (e.g., dimensions) of a selected shape.

In some examples, the IAP 100 includes instructions that enable a user computing device to utilize multiple application services at one time, in connection with the user computing device accessing, updating and/or creating a workspace design file. In examples, each workspace file can be associated with a particular application service, and by default, a computing device that opens the workspace file utilizes the default application service to access and update that workspace file. The user may also switch modes on the IAP 100 to utilize another application service to update the workspace file.

The computing device 10 can use web-based application 80 to access a website of the network service 152 to download the webpage or web resource. Upon accessing the website, web-based application 80 can automatically (e.g., through saved credentials) or through manual input, communicate an account identifier to the service component 160. In some examples, web-based application 80 can also communicate one or more additional identifiers that correlate to a user identifier.

The service component 160 can also retrieve the files of an active workspace ("active workspace files 163") that are linked to the user account or identifier from a file store 164 which can store the data sets that comprise the workspace. The data sets stored with the file store 164 can include, for example, the pages of a workspace and one or more data structure representations 161 for content under creation (e.g., a design under edit) from the respective active workspace files. As an addition or variation, each file can be associated with metadata that identifies the design application that was used to create the particular file.

On individual user devices 10, 12, the respective user can view the workspace representation through web-based application 80, and the user can elect to open a file of the workspace through web-based application 80. In examples, upon a user electing to open one of the active workspace files 163, web-based application 80 initiates the canvas 122. For example, the IAP 100 can initiate an HTML 5.0 canvas as a component of web-based application 80, and the rendering engine 120 can access one or more data structures representations 111 of the rendered workspace file on the canvas 122. In some implementations, the data structure representation 111 can be structured in node and object form. For example, the data structure representation 111 can correspond to a hierarchical nodal structure, where each node represents a design element and has a hierarchical arrangement with other nodes of a content rendered from an active workspace file.

In examples, the IAP 100 can be implemented to execute with multiple modes of operation, where each mode corresponds to one of the application services provided by the network computer system 150. The program interface 102 can include alternative modes of operation. For example, the application framework and input interface 118 can differ in form, function or configuration as between the alternative modes of the IAP 100. In some examples, the set of interactive tools or editor provided by the program interface 102 can differ based on the application service which the workspace file is associated with. Additionally, the type of actions the user can perform to register input can vary based on the alternative modes of the program interface 102. Still further, the different modes of program interface 102 can include different input or user-interface features for the user to select and use for inclusion on the canvas 122. By way of example, when the IAP 100 is operating in a first mode for a whiteboarding application service, the program interface 102 can provide input features to enable a user to select design elements from a first library of design elements, as well as design elements that include inherent functionality (e.g., design element that displays an active timer). When the IAP 100 is operating in a second mode, the IAP 100 can provide a graphic design application service, utilizing a second library of design elements that is different than the first library, and further without use of widgets. When the IAP 100 is operating in a second mode, the IAP 100 can provide a presentation application service, utilizing a third library of design elements that utilize textual and graphic elements. Further, the functionality provided with each application service may be different. For example, in a graphic design application service, the user can select (e.g., via input with input interface 118) a simulation sub-mode, where a series of designs created on a canvas are simulated in a run-time environment. In another application service, the simulation sub-mode may not be available.

Still further, the rendering engine 120 can include logic to enable alternative behaviors for different modes of operation, based on the application service that is in use. By way of example, the rendering engine 120 can implement mode-specific logic to vary, based on the mode of operation, the behavior of objects that are selected, the manner in which objects can be resized or moved, as well as the manner in which objects are rendered on the canvas 122.

In examples, each of the application services can utilize a shared library of content elements, as well as core functionality that enables content elements to be shared and updated between the different application services that are available through the platform. Additionally, the file type (e.g., workspace file) created and edited through use of one application service can be utilized with the other application service. Moreover, the transition between application services can be seamless—for example, the user computing device 10 can open a workspace file using the first application service (e.g., interactive graphic application service for UIX design) then seamlessly switch to using the second application service (e.g., whiteboarding application service) while the same content is continuously rendered on the canvas. Thus, for example, the user can switch application services while working on a workspace file, without closing the workspace file. In such example, each application service enables the user to update the workspace file even while the workspace file is in use in a collaborative environment. In such examples, the user can mode switch the IAP 100 to switch which application service is being used with the workspace file.

In an example of FIG. 1, a collaborative platform is implemented by the network computing system 150, which communicates with multiple user computing devices 10, 12 over one or more networks (e.g., World Wide Web or other cloud computing networked computer system) to implement the IAP 100 on each computing device. While FIG. 1 illustrates an example in which two users utilize the collaborative platform, examples as described allow for the network computing system 150 to extend, and enable collaboration on, design interfaces amongst a larger group of users.

With further reference to FIG. 1, the user computing devices 10, 12 can be operated by users that collaborate to create and/or update the workspace file. In examples, the user computing devices 10, 12 are associated with a common account, with each user computing device 10, 12 implementing a corresponding IAP 100 to access the same workspace file during respective sessions that overlap with one another. Accordingly, each of the user computing devices 10, 12 may concurrently access the same set of active workspace files 163, with the respective program interface 102 of the IAP 100 on each user computing device 10, 12 operating to establish a corresponding communication channel (e.g., web socket connection) with the service component 160. The IAP 100 can be implemented to enable each computing device 10, 12 to access and update the active workspace files 163 by, for example, making a local copy of the active workspace files 163, and synchronizing the change made to the active workspace file 163 with the network computing system 150, while receiving from the network computing system 150 changes made to the active workspace file 163 by the other computing devices 10, 12 of the shared session.

Accordingly, in examples, the service component 160 can communicate a copy of the active workspace files ("AWSF") 163 to each user computing device 10, 12, such that the computing devices 10, 12 can utilize the active workspace file 163 at the same time to render the workspace file. In some examples, an active workspace file 163 can be associated with a default application service, and each computing device 10, 12 can open the active workspace file 163 using the associated (or default) application service. Each of the computing devices 10, 12 can maintain a local data structure representation 111 of the content 125 rendered from the shared workspace file. The service component 160 can also maintain a network-side data structure representation 161 obtained from the files of the active workspace 163, and coinciding with the local data structure representations 111 on each of the computing devices 10, 12. In examples, each of the local data structure representation 111 and the network-side data structure representation 161 can represent the content 125 generated from the shared workspace file as nodes and objects. For example, each of the local and network-side data structure representations 111, 161 can be structured as a hierarchical nodal representation of the shared content as rendered on the canvas 122, with individual content elements (e.g., frame for design file, widget for whiteboarding application, slide or slide element for presentation application, etc.) being defined as nodes with corresponding attributes. As an addition or variation, the hierarchical relationship of the shared content can be implemented as a document object model (DOM) type representation (e.g., with individual content elements being represented as a node of the DOM).

In some examples, the user of the computing devices 10, 12 can switch the operational mode of the IAP 100 so as to view and update the workspace using an alternative application (e.g., non-default) application service. For example, each of a first or default application service and an alternative application service can render the content 125 using the local data structure representation 111, where the content 125 can be provided in each of the respective application services using tools and functionality that are specific to the particular application service. Further, in some variations, the active workspace files 163 can be updated by the users utilizing either of the application services.

By way of example, during a collaboration session, users can collaboratively view and edit the workspace file 163 using one or multiple alternative application services, such as a graphic design application and/or whiteboarding application service. In such an example, the network computer system 150 can detect changes made by users that utilize either of a graphic design application service or whiteboarding application service, and the network computer system 150 can propagate detected changes on any one of the user computing devices 10, 12 to the other user computing devices. Further, individual users that participate in the collaborative environment can download and open the workspace file 163 using a default application service (e.g., whiteboarding application service), then switch to the other application service (e.g., a design application service) without closing the workspace file.

In some examples, web resources are available with a given workspace file 163 to include a content library of content elements, such as design elements where, for example, wire-frame shapes and/or shapes with attributes (e.g., color, line thickness, etc.) can be stored. Depending on implementation, the content library can be made available to one or more of the application services. Yet further, in examples, the content application library can be updated by users using either of the application services. Moreover, in some variations, changes made by individual users to content elements of the content library can be propagated to (i) instances of the content library provided to other user computing devices (e.g., such as users of a collaborative session), and/or (ii) the design interfaces rendered on local canvas of other users which utilize the particular content element.

The network computing system 150 can continuously synchronize the active workspace files 163 on each of the user computing devices. In particular, changes made by users to a selected active workspace file 163 on one computing device 10, 12 may be immediately (i) reflected in the respective data structure representation 161 of the workspace file, and (ii) rendered on the other user computing device 10, 12. By way of example, the user of computing devices 10, 12 can make a change to the respective workspace file 163, rendered as content 125, and the respective rendering engine 120 can implement an update that is reflected in the local data structure representation 111. From the computing device 10, the program interface 102 of the IAP 100 can stream change data 121, reflecting the change of the user input, to the service component 160. The service component 160 processes the change data 121 of the user computing device. The service component 160 can use the change data 121 to make a corresponding change to the network-side data structure representation 161. The service component 160 can also stream remotely-generated change data 171 (which in the example provided, corresponds or reflects change data 121 received from the user device 10) to the computing device 12, to cause the corresponding IAP 100 to update the workspace file as rendered on the other device. The computing device 12 may also use the remotely generated change data 171 to update with the local data structure representation 111 of that computing device 12. The program interface 102 of the computing device 12 can receive the update from the network computing system 150, and the rendering engine 120 can update the workspace file 163 and the respective local copy of 111 of the computing device 12.

The reverse process can also be implemented to update the data structure representations 161 of the network computing system 150 using change data 121 communicated from the second computing device 12 (e.g., corresponding to the user of the second computing device updating the workspace file as rendered on the second computing device 12). In turn, the network computing system 150 can stream remotely generated change data 171 (which in the example provided, corresponds or reflects change data 121 received from the user device 12) to update the local data structure representation 111 of the workspace file 163 on the first computing device 10. In this way, the workspace file 163 of the first computing device 10 can be updated as a response to the user of the second computing device 12 providing user input to change the workspace file.

To facilitate the synchronization of the data structure representations 111, 111 on the respective computing devices 10, 12, the network computing system 150 may implement a stream connector to merge the data streams which are exchanged between the first computing device 10 and the network computing system 150, and between the second computing device 12 and the network computing system 150. In some implementations, the stream connector can be implemented to enable each computing device 10, 12 to make changes to the network-side data structure representation 161, without added data replication that may otherwise be required to process the streams from each device separately.

Additionally, over time, one or both of the computing devices 10, 12 may become out-of-sync with the server-side data structure representation 161. In such cases, the respective computing device 10, 12 can re-download the active workspace files 163, to restart the maintenance of the data structure representation 111 of the workspace file that is rendered and edited on that device.

Presentation Features

In examples, the IAP 100 operating on each user device 10, 12 enables users to conduct shared sessions while the users collaborate on a workspace file. When a shared session is initiated, the user device of one of the users ("presenter device") transmits view data 115 to the computing devices of other collaborators ("follower device(s)") via the network computer system 150, enabling the view of the presenter device to be mirrored on the other collaborator devices.

In some examples, the network computer system 150 can provide individual user devices 10, 12 with view state logic 126, which can be executed by the respective rendering engine 120 to enable the user device to operate as a presentation device or a follower device. Further, the network computer system 150 includes a presentation handler 170 to implement a shared session amongst a group of users collaborating on a workspace file.

In examples, the rendering engine 120 can execute view state logic 126 on a presenting computing device (e.g., user device 12) to record and transmit view data 115, where view data 115 defines or represents a view state of the shared workspace file as rendered on the presenter's device. In examples, the view data 115 can include parametric information that identifies, for example, one or more of (i) region of the shared workspace file that is viewable on the presenter device, (ii) a magnification level for the rendered content 125, (iii) specific nodes that are viewed, including information about a rendered state of the node, (iv) position information that identifies a screen position (or coordinates) of the user's cursor, and/or (v) other parametric information that reflects the view state of the rendered content on the presenter device. The follower devices (e.g., user device 10) can receive the view data 115 generated on the presenter device, and on each follower device, the rendering engine 120 utilizes the view data 115, as generated on the presenter device 12, to cause one or more follower devices 10 to have a corresponding view state that mirrors the view state of the presenter device 12.

In examples, the view state of each collaborator's view of the rendered content can be defined in-part by parametric values that are communicated with or based on the view data 115 generated by the presenter device. In examples, the parametric values define, on respective collaborator devices, (i) the viewable portion of the shared workspace or content, by, for example, section, page, or region and/or display coordinates; (ii) the magnification level of the rendered content, (iii) view states of specific nodes (e.g., frames or objects) that are viewable (e.g., node selected to be hidden versus visible, node selected be rendered as an outline, etc.), (iv) position information (e.g., display coordinates) for the cursor element, and/or cursor data that is descriptive of the appearance of the cursor element, and/or (v) other parameterized aspects of the view state of the rendered content. In such examples, the IAP 100, in combination with the network computer system 150, enables the view state 115 of the presenter device 12 to be mirrored on follower devices 10 using such parameterized information. Further, in examples, the view state of the presenter can be mirrored without using image data generated from the IAP 100 of the presenter device.

Among other advantages, this allows a follower device 10 to continue to interact with the shared workspace file while the view state of the follower mirrors that of the presenter device 12. For example, a user of the follower device 10 can follow the shared session/presentation, then breakaway to update or attend to another portion of the shared workspace or content. Even after the user of the follower device 10 breaks away, examples enable the user to interact with the IAP 100 to rejoin the shared session. In this manner, the user can join, breakaway and rejoin the shared session without leaving the application service or collaborative session. Throughout the shared session, the user can independently interact with the shared content and also participate as a follow with the shared session.

Accordingly, when the shared session starts, on each follower device, the rendering engine 120 uses the view data 115 of the presenter device to navigate the user's view of the rendered content to the portion that is being viewed on the presenter device. Further, on each follower device, the rendering engine 120 can adjust the magnification level of the follower's view to mirror the magnification level of the presenter's view. As an addition or variation, the rendering engine 120 can use the view data 115 to generate an indicator of the cursor position of the presenter in real-time, while the presentation is taking place. Using the view data 115, the rendering engine 120 can operate on each follower device to render the workspace file with an indicator that tracks in real-time the position of the presenter's cursor. In this way, follower devices can see the presenter's cursor position and movement as the presenter interacts with a canvas on which the rendered workspace file is rendered.

In some examples, the cursor representation on the follower device can amplify the cursor indicator of the presenter device (or what would be shown by default). For example, the indicator of the presenter's cursor can be enlarged, made dynamic or otherwise provided with visual effect (e.g., comet tail) when represented on the follower device. In this way, the cursor positioning and/or movements on the presenter device can be more readily observed on the follower devices. Further, the rendering engine 120 can alter content provided with the cursor to include, for example, an avatar, text content or other information that is provided or based on the presenter computer device 12.

Still further, in some examples, the view data 115 can include additional data sets that reflect a view state of rendered content (e.g., how the rendered content appears on the user device). For example, the view data 115 can also reflect specific layers that a user has selected to view graphic elements at a given canvas location, where individual layers include content elements that overlay one another as a logically defined layer.

While some examples provide for the view data 115 to include parametric information, in variations, the view data 115 can include image data, such as snapshots of the presenter's view. Thus, for example, once the presenter device starts presenting, the rendering engine 120 can execute the view state logic 126 to generate and transmit image data (or data packets representing image data) to the presentation handler 170, which re-streams the view data 115 to the follower devices.

In examples, a given user that is actively working and collaborating on, for example, a graphic file, can initiate a shared session where a presenter is selected from the group of collaborators. The collaborators can be actively accessing and editing/viewing the same workspace file at the same time. In some implementations, the given user selects him or herself as the presenter. In variations, the given user can select someone else in the group of collaborators as presenter. For example, the given user can select to follow a second user as collaborator, in which case the second user is the presenter. Accordingly, in examples, a shared session is initiated when one user amongst the group of collaborators is selected as a presenter, and one or more other users of the group select to follow the presenter.

In an example of FIG. 1, the network computer system 150 is shown to include a presentation handler 170, representing server-side logic and processes for implementing a shared session. The shared session can occur during a collaborative session, where one collaborator's device presents to the devices of the other collaborators. During a shared session, the rendering engine 120 operates on the presenter device (e.g., user device 12) to transmit view data 115 to the network computer system 150. The presentation handler 170 can operate to associate the view data 115 with the current data structure representation 111 of the workspace file. The presentation handler 170 can transmit the view data 115 to the follower devices (e.g., user device 10). If changes are made to the workspace data, the view data 115 can be transmitted with change data 121, 171 such that changes made by the presenter (or other user) to the workspace file are reflected in the rendering of the workspace file on the follower device(s) 10.

On a follower device (e.g., user device 10), rendering engine 120 executes the view state logic 126 to receive view data 115 and adjust viewing parameters of the rendered workspace file to mirror the view state of the presenter device (e.g., user device 12). Further, on each participating user device, the respective rendering engine 120 (i) receives change data 171 from the service component 160 as changes are made to the workspace file, and (ii) updates the workspace file on the follower device 10. Thus, as the presenter interacts with the IAP 100 on their respective device 10 to update the workspace file and/or change the view state, the follower devices can receive and implement the changes in real-time.

Accordingly, examples provide that on the follower device, the rendering engine 120 receives and implements the view data 115 such that the view state of the workspace file on the presenter devices (e.g., user device 10) matches the view state of the same workspace file on the follower devices (e.g., user device 12). On the follower device 12, the content of the workspace file is generated to include (i) a magnification (or zoom level) that matches that of the presenting device, (ii) a focus on a particular region of the canvas 122 for the shared content, (iii) a cursor indicator reflecting a cursor position of the presentation device, (iv) a cursor content or appearance to match that of the presenter, and/or (v) hiding or making visible layers including aspects or portions of the hared content.

As described by examples, the view data 115 is generated on the presenter device 10 and transmitted to the follower devices 12 in real-time (or near real-time), such that followers can view the content of the workspace file in a view state that matches or is otherwise based on the view state of the presenter device 10. Further, the network computer system 150 can also allow for one or more media channels to facilitate the shared session. In some examples, when a shared session is initiated, an audio channel is also created between the presenter and followers. Each user device 10, 12 of the group of collaborators can include a media player component 128 that records and plays back audio. Upon initiation of a shared session, the network computer system 150 interconnects to an audio channel between the respective media player components 128, such that audio (or media) data can be streamed from presenter device to follower device. As an alternative or variation, the audio channel can be implemented to allow for multi-way audio communications, such that followers can communicate to the group during the shared session.

In examples, the presentation handler 170 can record instances when a shared session is initiated. The presentation handler 170 can identify a user-identifier of each participant of the shared session. The network computer system 150 can maintain profile data sets 155 for individual users, where for each user, the profile data set 155 includes an identifier, an avatar and/or other information. Further, the profile data sets 155 can include identifiers and associations between collaborators, such as associations where individual collaborators follow other collaborators. The presentation handler 170 can communicate participant information 172 to the user device 10, 12 of each collaborator, such that collaborators can identify one or more of (i) users that they follow, (ii) users that follow them, and/or (iii) during a shared session, the presenting user (e.g., if someone else), and other collaborators who are follower devices to the presentation. On each user device, participant information can include, for example, avatars of individual participants and/or other information. Further, the IAP 100 can also include logic to order or otherwise arrange identifiers of the participants of a shared session. For example, on each computing device, the avatars can be arranged left-to-right or top-to-bottom, and further in accordance with a sequence that prioritizes (i) the presenter of a shared session, (ii) the followers of the shared session, (iii) other users that a corresponding user of the computing device follows, and/or (iv) other users that follow a corresponding user of the computing device.

In examples, the IAP 100 is implemented on each user device 10, 12 to implement the collaborative platform, and to enable collaborators to initiate shared sessions at any time. The IAP 100 can be configured to include, or otherwise provide a set of presentation tools 132 on each user device 10, 12. The presentation tools 132 can allow collaborators to initiate and participate in ad hoc shared sessions. In some examples, the set of presentation tools 132 can be provided as a functional layer that persistently overlays the view of the collaborators, allowing individual collaborators to select to present with the click of a mouse. Further, the presentation tools 132 can enable individual collaborators to view avatars and information about other collaborators of the workspace file.

By way of example, the presentation handler 170 can receive a communication indicating a collaborator of user device 12 wishes to initiate a presentation device. The presentation handler 170 can initiate a process on the user device(s) of the other collaborator, where the process enables each of the identified collaborators to elect to join, or decline to join, the presentation. The presentation handler 170 can send a notification 174 to the user devices of collaborators that are invited to join the shared session. On such user devices, the notification 174 can be interactive, to enable the recipient to, for example, choose to decline to join the presentation. Further, on the computer device of the recipient, the notification 174 can be rendered to overlay the canvas at a location which the respective user has in focus, such that the user can view and interact (e.g., decline to participate in the presentation) with the notification without navigating away from the location of their attention. In examples, the user can ignore (or take no action) when the notification is displayed to cause implementation of a default action where the user device is joined or not joined to the shared session.

In examples, the notification 174 can be integrated or otherwise provided with a countdown timer, where upon expiration of the countdown timer, the notification expires. The recipient can interact with the notification 174 to decline the invitation to join the shared session. Alternatively, the user can elect to join the presentation by allowing the countdown timer to expire. If the recipient of the notification 174 does not decline the invitation to join the presentation (e.g., through interaction with the notification), then upon the expiration of the timer, the presentation handler 170 joins the corresponding user device to the shared session, and the user becomes a follower of the presentation. The presentation handler 170 then transmits view data 115 generated from the presenter device to each follower device of the shared session. The rendering engine 120 on each follower device can use the view data 115 to generate a view state for the shared workspace that mirrors the view state of the presenter device. According to some examples, the presentation handler 170 opens a streaming connection with the presenter device to receive the view data 115 generated from the presenter device. Further, the presentation handler 170 can open a streaming connection to each follower device to restream view data 115 generated by the presenter device.

In examples, the follower device can elect to stop following a shared session through interaction with the presentation tools 132. According to some aspects, once a follower device stops following a presentation, the rendering engine 120 on the follower device can revert to the view state that was present on that user device just before the user joined the shared session. In another aspect, once the follower device stops following the presentation, the corresponding user device maintains the current view state, which mirrors the presenter device just before the follower device stopped following the presentation.

As another addition or variation, a follower can interact with the presentation tools 132 to become the presenter. In such examples, a follower can become the presenter for the same shared session by interacting with the presentation tools 132 to send a present communication. The network handler 170 can receive the present communication from one of the followers, designating him or herself as the new presenter for the shared session. In some examples, the presentation handler 170 replaces the existing presenter with the follower that signaled the present communication. The network handler 170 can implement the presenter switch by receiving view 115 data from the new presenter device, and restreaming the view data 115 to the user devices of other users participating in the shared session. The prior presenter then becomes a follower and receives the view data 115. In such examples, the network handler 170 can maintain streaming connections to enable the presenter switch to occur fluidly, without interrupting the shared session.

In examples, a given user (e.g., user who intends to be presenter) can initiate a shared session through a dedicated action, such as through input to a feature provided with the IAP 100 to initiate the shared session. In some variations, a user can initiate a session through alternative triggers. For example, a user can interact with a dynamic chat interface and type a command (or sequence of commands that are interpreted as a command). The chat interface can be implemented as a bot, or a cursor-chat or other interactive feature.
Methodology FIG. 2A illustrate an example method for initiating a shared session on collaborative platform, according to one or more examples. FIG. 2B illustrates an example method for implementing a shared session for a group of computing devices, according to one or more examples. Example methods such as described with FIG. 2A and FIG. 2B can be implemented by a network computer system 150 that implements a collaborative application platform, such as described with examples of FIG. 1. Accordingly, reference is made to elements of FIG. 1 for purpose of illustrating components and functionality for performing a step or sub-step being described.

With reference to FIG. 2A, in step 202, the method includes enabling a plurality of users to operate corresponding computing devices to collaborate on a shared workspace file. The computing device of each user can implement an integrated application platform (IAP 100), using instructions and/or data communicated from the network computer system 150. As described with examples of FIG. 1, the plurality of user devices can implement an application service of the IAP to view and edit a shared workspace file at the same time. The shared workspace can include, for example, a shared canvas on which graphic content (e.g., whiteboard content, graphic design, presentation, etc.) is provided. In examples, each user can participate in the collaborative environment to independently view and/or edit graphic content of a shared canvas at the same time.

In step 204, the method includes enabling at least a first user of the group of collaborators to initiate or otherwise trigger a shared session. The first user can provide input to initiate the shared session, where the input identifies a user computing device is to be the presenter device from which view data 115 is generated. The presenter computing device can correspond to, for example, the computing device of the first user.

In step 206, upon the shared session being triggered, the method includes initiating a countdown timer on the user device of each user of the subset. In some examples, the network computer system 150 also initiates a countdown timer on the presenter device.

In step 208, the method includes enabling each user of the subset make a selection to join or not join the shared session. In some examples, the network computer system 150 causes each user device to display the notification 174, which includes a prompt or invitation for the user to join the shared session. The notification 174 can be interactive to enable the corresponding user of the non-presenting device to make the selection to join or not join the shared session. In some examples, the user can respond to the notification by (i) providing input to accept the invitation and joining the shared session as a follower, (ii) providing input to decline the invitation; or (iii) taking no action and allowing the timer to expire.

In step 210, upon termination of any corresponding timer on the respective computing device of the subset where the corresponding user does not make a selection, the method includes implementing a default selection for that computing device. For example, the user can respond to the prompt to decline to join the shared session. Otherwise, the user is automatically joined to the shared session upon expiration of the timer.

In step 212, the method includes transmitting view data generated from the first computing device (or the presenter device) to each computing device of the subset (or the follower devices), to cause the follower devices to mirror the view state of the shared workspace file, as rendered on the presenter device. As described with some examples, the view data can include parametrized data to enable each follower device to mirror the view state of the presenter device.

With reference to FIG. 2B, in step 230, during the shared session, the method includes, receiving and transmitting view data 115 from the presenter device to each follower device. The view data 115 may be generated by, for example, the rendering engine 120 executing view data logic 126 on the presenter device. Additionally, the network computer system 150 can receive change data 121, reflecting changes to the workspace file 163, from the presenter device 12 or the user device of any of the collaborators. The network computer system 150 implements processes to transmit view data 115 and change data 121, to each follower device 10. The change data 171 can also be transmitted to non-follower devices. As described with other examples, the shared session can reflect the view state of the rendered workspace file 163 on the presenter device 12. The network computer system 150 can repeatedly (or continuously) transmit the view data 115 of the presenter device 12 to the follower devices 10, such that the view state on each follower device 10 is dynamically updated to mirror the view state of the presenter device 12. In some examples, the view state of the presenter device 12 can be mirrored so that the cursor of the presenter is also represented on the follower devices 10.

While the presentation is ongoing, in step 240, the method includes implementing a presenter switch based on input from a follower of the shared session. For example, the network computer system 150 can receive input in which a follower of the shared session communicates to become a presenter, such that the user device 10 of the follower becomes the presented device.

In step 244, the method includes changing the presenters of the shared session without terminating the shared session. Further, the presentation switch can occur without disrupting the streaming connections between, for example, the presentation handler 170 and the other follower devices. In this way, the shared session remains continuous, with only presenter's being changed. In examples, the network computer system 150 implements one or more operations to change the presenter for the shared session, including (i) triggering the user device of the existing presenter to stop transmitting view data 115 and enabling the presenter device to review view data; and (ii) initiating the user device of the second user to generate and transmit view data 115 to the network computer system.

In examples, the operations for changing the presenter of the shared session are performed automatically. In variations, the operations are performed upon other operations being performed. For example, in some variations, upon the second user providing input to become a presenter for the shared session, the followers of the shared session (or of the second user) may receive an invitation. Further, a timer can be initiated on the individual follower devices, where the timer enables the follower devices to not follow the shared session with the second user as presenter.

Accordingly, as described with an example of FIG. 2B, when a shared session is initiated by a first user/presenter, and then a second user/presenter opts to become a presenter, the network computer system 150 automatically associates the follower devices with the second presenter, such that the shared session has continuity.

Further, in some examples, individual users can have their own set of followers. For example, one collaborator can follow another collaborator to observe. Thus, each user that presents during a shared session can be associated with a set of followers that is different from the followers of the presentation. When presenters switch during a presentation, the network computer system 150 can automatically associate the presenter with the followers of the presentation, rather than those collaborators that are separately following the second user.

Example Interfaces

FIG. 3A through FIG. 3C and FIG. 4A through FIG. 4D illustrate examples of shared sessions for collaborative platforms, according to one or more embodiments. Examples such as described with FIG. 3A through FIG. 3C and FIG. 4A through FIG. 4D can be provided through implementation of an integrated application platform 100, such as described with FIG. 1 and FIG. 2A through FIG. 2B. Accordingly, in describing examples of FIG. 3A through FIG. 3C and FIG. 4A through FIG. 4D, reference may be made to elements of FIG. 1 for purpose of illustrating components and functionality for implementing a shared session for a collaborative platform With further reference to FIG. 3A through FIG. 3C, an interface 300 can be generated for a shared content that is rendered on a computer device of a collaborator. In an example of FIG. 3A through FIG. 3C, the shared content can be provided for a graphic design application and/or a whiteboarding application. Accordingly, the content elements of the shared content includes graphic elements, such as frames or objects. In variations, the workspace file can be for a presentation application (e.g., slide deck presentation) a code writing application, document processing application or other type of application that can be implemented in a collaborative platform.

On a given collaborator device, the interface 300 renders at least a portion 302 of the shared content, using a local copy of the workspace file. Other collaborators devices can render content from versions of the same workspace file, with each user device that participates in the collaborative session maintaining the respective local workspace file in synchronization with a network version of the workspace file. The network computer system 150 can ensure that all of the local workspace files are synchronized, so that each user device 10, 12 renders content from the workspace file in its current state. Further, while some user devices 10, 12 render content from the workspace file from one portion, other user devices 10, 12 can render content from different portions of the same workspace file.

In an example shown, at least some of the collaborators of the workspace file can be indicated by avatars 312 on a region of a canvas 322. The region can include one or more presentation tools for enabling the individual users to initiate or participate in shared sessions. The presentation tools can be implemented as a persistent feature, such that it overlays the canvas 322 while the user may navigate through the content generated from the workspace file.

In an example shown, another user ("Jane") has signaled a desire to initiate a shared session as a presenter. A countdown timer 310 can be initiated on each user device 10, 12 of the collaborative session, including the presenter device and/or non-presenting devices. The countdown timer 310 can be implemented independently on the individual user devices 10, 12.

In examples, a user (e.g., presenter) can initiate a shared session, giving all of the collaborators who are accessing the workspace file at the particular time an opportunity to join the session. As an addition or variation, the presenter can select the audience for the shared session. For example, the audience can be selected from a list of collaborators of the workspace file who are active. In some examples, the countdown timer 310 can be integrated or otherwise implemented as part of an interactive notification, where the user can interact with the notification by declining not to join the shared session (e.g., clicking "cancel"). In variations, the user can interact with the notification by accepting or declining the invitation to join the shared session.

Upon expiration of the countdown timer 310, the network computer system 150 implements a default action. In examples, the default action includes joining the collaborator as a follower to the shared session. Thus, examples as shown enable the user to join the shared session without providing any input. In other aspects, the user can interact with the notification 310 to join the shared session.

Figure 3A:
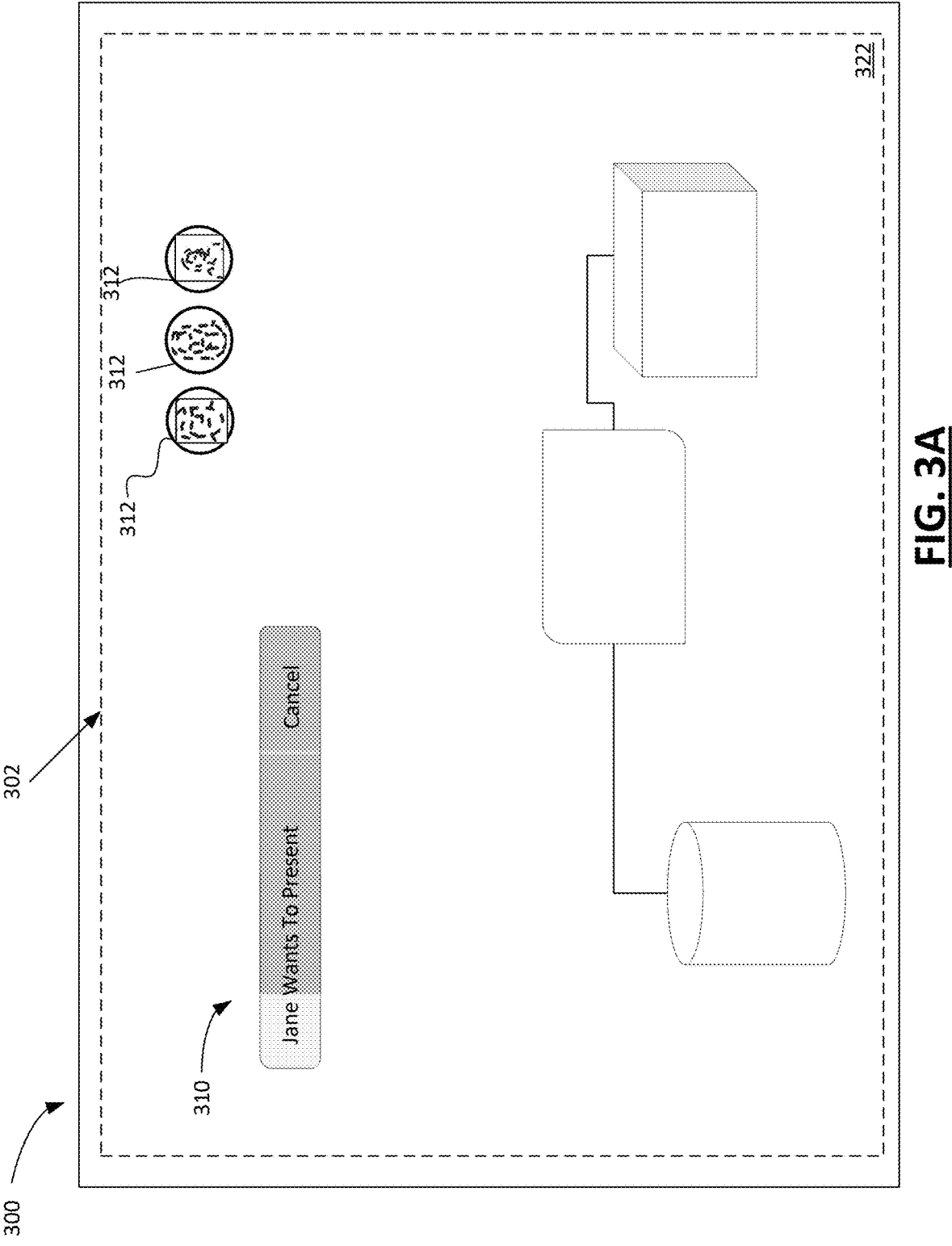
FIG. 3A through FIG. 3C illustrate example interfaces for a shared session provided through a collaborative platform, according to one or more embodiments.
Figure 3B:
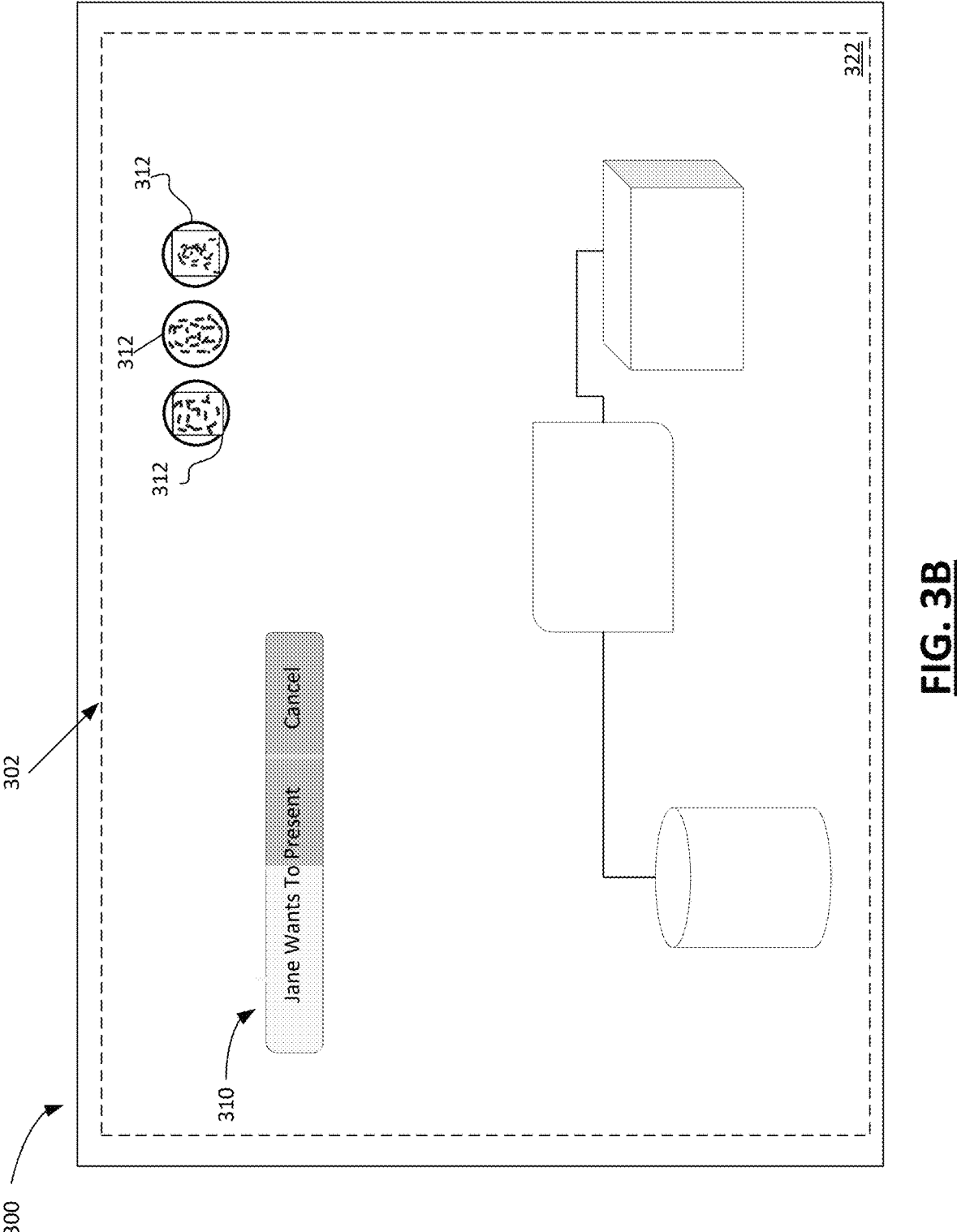
Figure 3C:
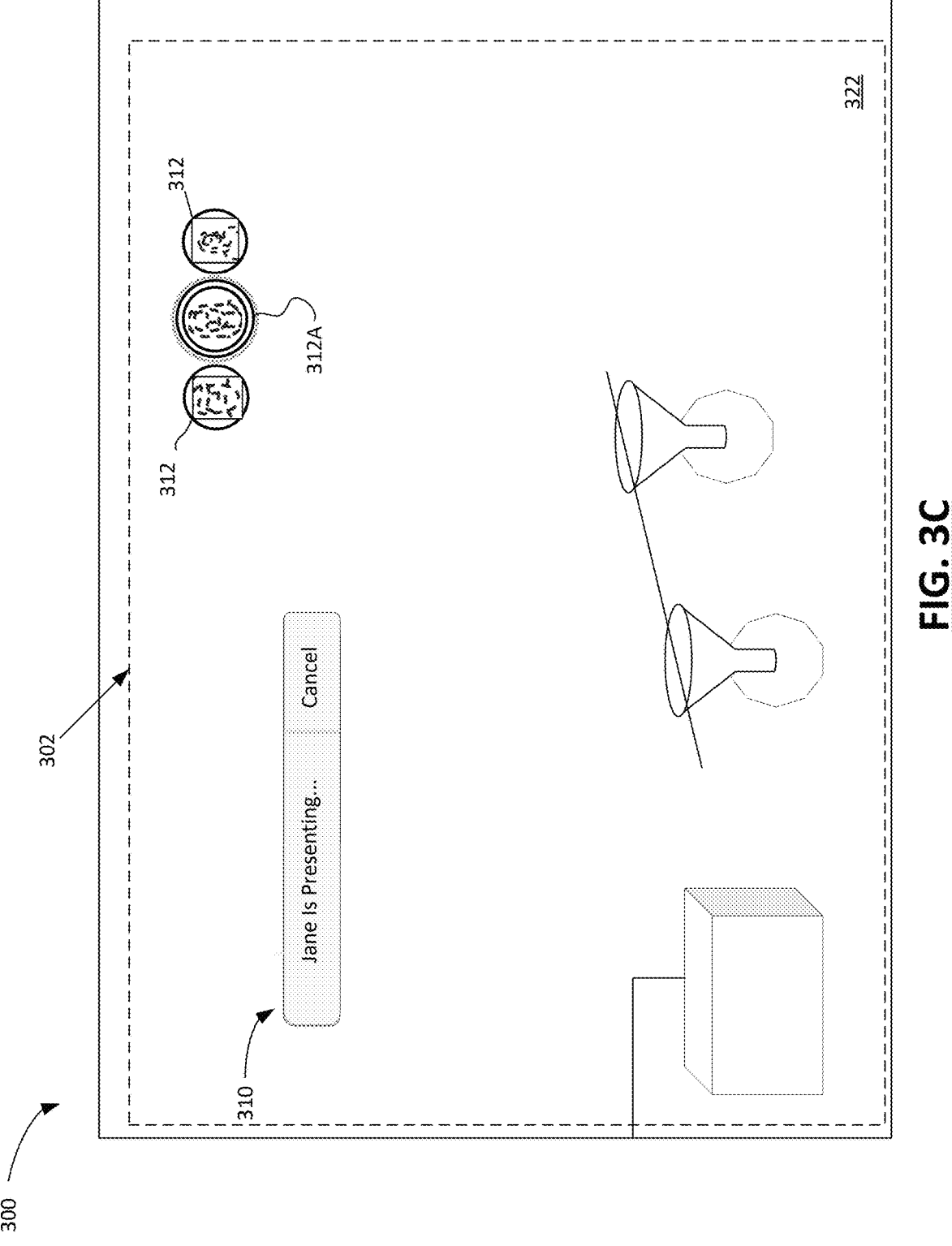

In examples, the countdown timer 310 can be represented visually as an object that changes fill attribute over time. Thus, the fill attribute of the object can reflect the passage of time. In FIG. 3A, the countdown timer 310 is shown at the start, coinciding with, for example, a user (e.g., the presenter) electing to hold a shared session. In FIG. 3B, the change in the countdown timer 310 is illustrated by one fill pattern increases over another as time progresses. In FIG. 3C, the countdown timer 310 is shown to expire, coinciding with the fill pattern being completely changed. On a recipient or non-presenting device, the countdown timer 310 in the filled or completed state signifies that the time for the user to take action has passed (or is about to pass), and the default action is to be implemented (e.g., non-presenter device is to be joined to the presentation).

In some examples, when the user is joined, the avatar 312A of the presenter is enlarged and/or provided an additional visual indicator or emphasis to indicate who the presenter is. The notification 310 with the integrated countdown timer may remain with a "Cancel" feature that the user can select to terminate their participation in the session.

Examples provided with FIG. 4A through FIG. 4D illustrate a sequence of events under which a given user ("Emily") of a collaborative environment can initiate a shared session, according to examples as described. As context for the example provided, multiple collaborators (e.g., "Joel", "Emily" and "Jane") can operate respective user devices 10, 12 to view and/or update a collection of slides.

Figure 4A:
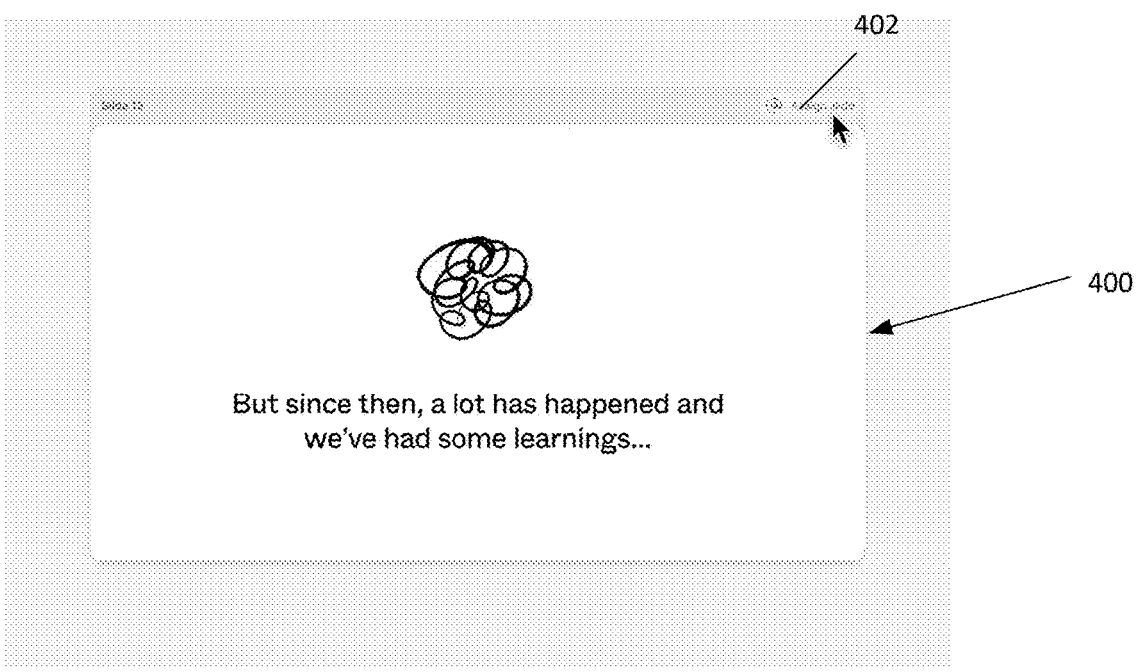
FIG. 4A through FIG. 4D illustrate additional examples of interfaces for a shared session provided through a collaborative platform, according to one or more embodiments.

In FIG. 4A, a slide deck presentation interface 400 is provided on the user device 10, 12 for a user ("Emily") that wishes to be a presenter for a shared presentation session. As described with other examples, the presentation interface 400 can be generated by the IAP 100, implemented on multiple respective user devices 10, 12 of collaborators. The user can interact with a feature 402 to initiate or trigger a process for starting the shared presentation session.

Figure 4B:
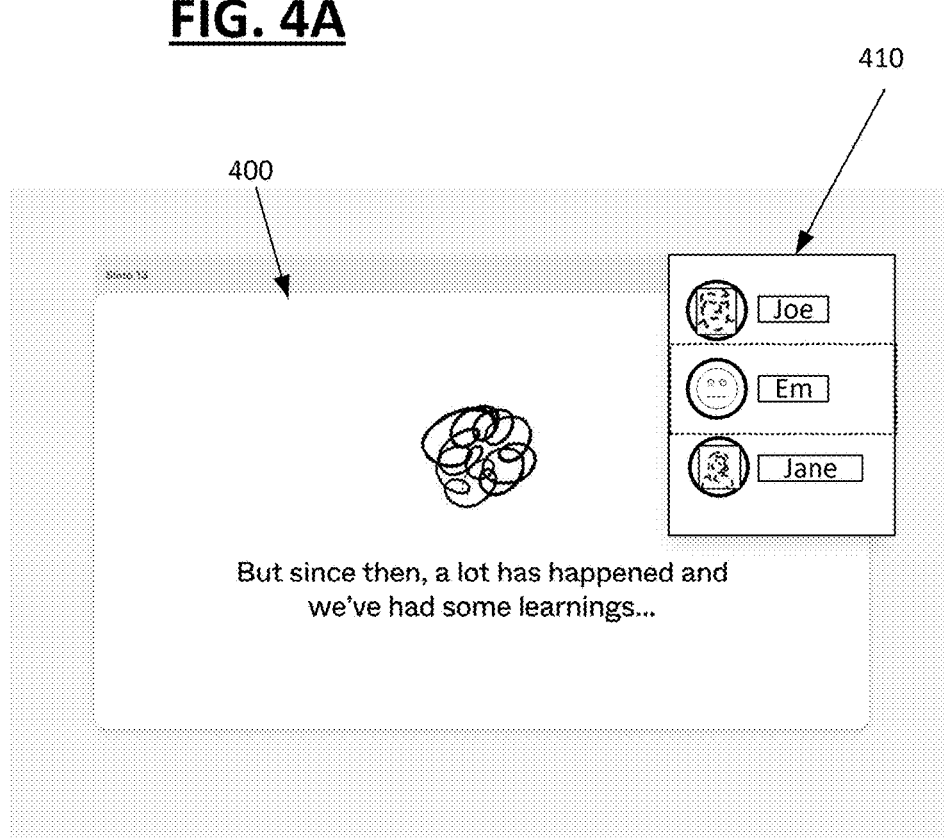

In FIG. 4B, the presentation interface generates a list 410 of active collaborators or participants. The active collaborators or participants can refer individuals were online, viewing the corresponding workspace file or otherwise available to join the shared presentation session. In some examples, the user who desires to present can scroll through the list 410 to select individuals to invite for the shared presentation session. The particular user can have his or her avatar made prominent to indicate their desire to be a presenter. In such examples, as long as a user is presenting, or has a role a presenter, his or her avatar may be provided in prominence relative to the avatars of the other users.

Figure 4C:
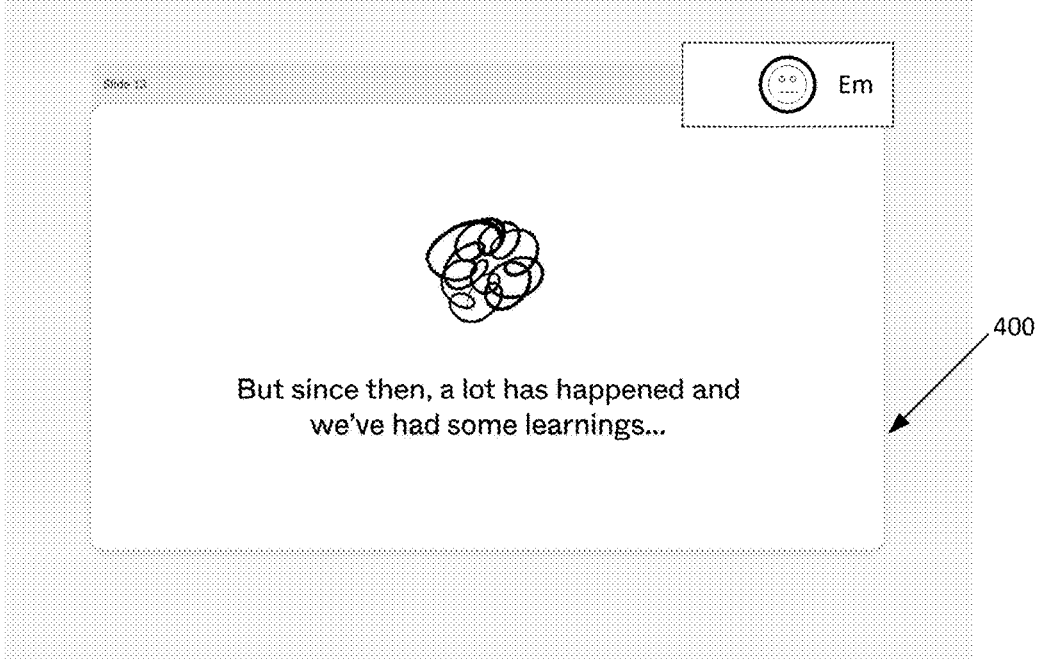

In FIG. 4C, once a presenting user selects the participants and initiates the shared presentation session, a countdown timer is initiated. The countdown timer can be initiated on the non-presenting (or recipient) user terminals. The countdown timer can provide invited users a given duration of time (e.g., five seconds) to elect out of the default action that will take place on the respective user device. The default action can correspond to the user being joined to the shared presentation session. Once joined, the user will view the presentation interface 400 with the particular view state of the presenting user (i.e., "Emily"). For example, a given recipient of the invitation may be viewing or editing the last slide of the slide deck presentation, but upon being joined to the shared presentation session, that user may be navigated to the slide deck with the presenter is viewing. Additionally, in some examples, the magnification or zoom level under which the recipient was viewing the slide deck may be changed to be consistent or the same as the presenter's magnification. Still further, in some variations, the manner in which the recipient is able to view the presentation interface 400 can be altered to include, for example, an indication of the presenters cursor position, cursor appearance or cursor content (e.g., text content provided with the cursor). The view state of the presenter device can thus be propagated to recipient devices that join the shared presentation session, where each recipient device implements the view state to view the shared presentation session in the same state as the presenter.

Figure 4D:
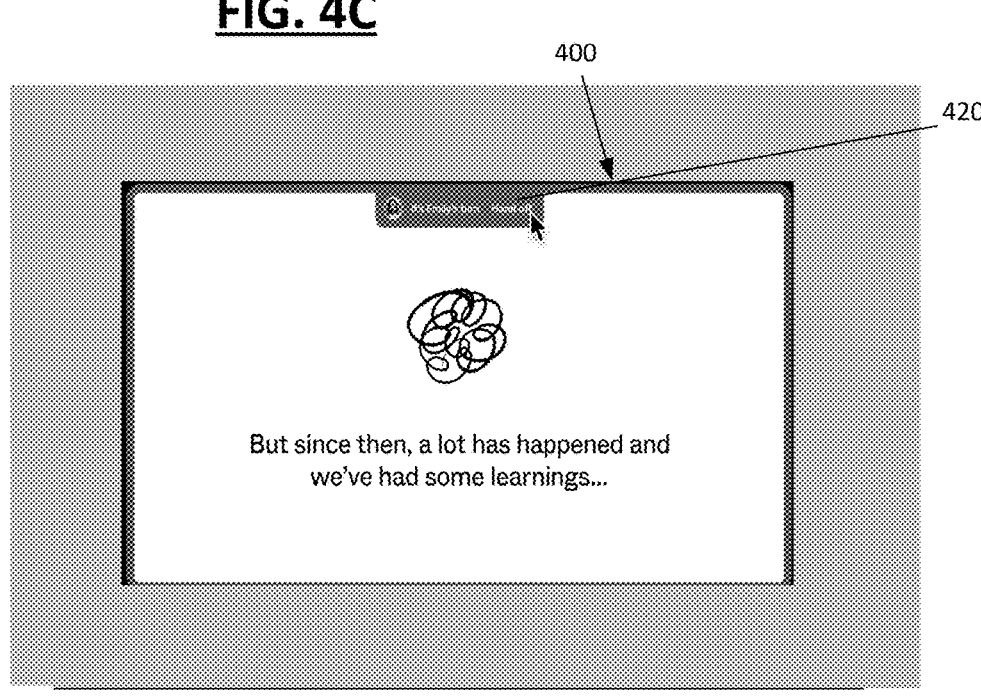

FIG. 4D illustrates an example of the shared presentation interface 400 as implemented during the shared session on the presenting user device. The presenter can elect to terminate presentation, or alternatively, to handoff the presentation to another participant of the shared presentation session. When a handoff occurs, the presentation session is not terminated, but continued with a different user acting in the role of presenter on the respective user device 10, 12. In some examples, the former presenter becomes a recipient or non-presenter. In variations, the shared presentation session can include two or more presenters.

In some variations, multiple users may act as presenters during a shared session. Further, one or more of subsequent presenters can be selected in advance of the presentation beginning, or before the handoff is performed. The presenters can be selected by, for example, the presenter, or other users who wish to participate in the shared session.

In examples, the recipient terminals can also elect to discontinue their participation in the presentation. For example, as described with other examples, a participant and non-presenter can elect to break away and work elsewhere on the shared content, then rejoin the shared session. When the user breaks away, the view state of that user's device can change to reflect that user's input with respect to the view state on the respective user device (e.g., user changes zoom level). When the user rejoins, in examples, the view state of the user's device can be synchronized to mirror that of the presenter's device.

Network Computer System

Figure 5:
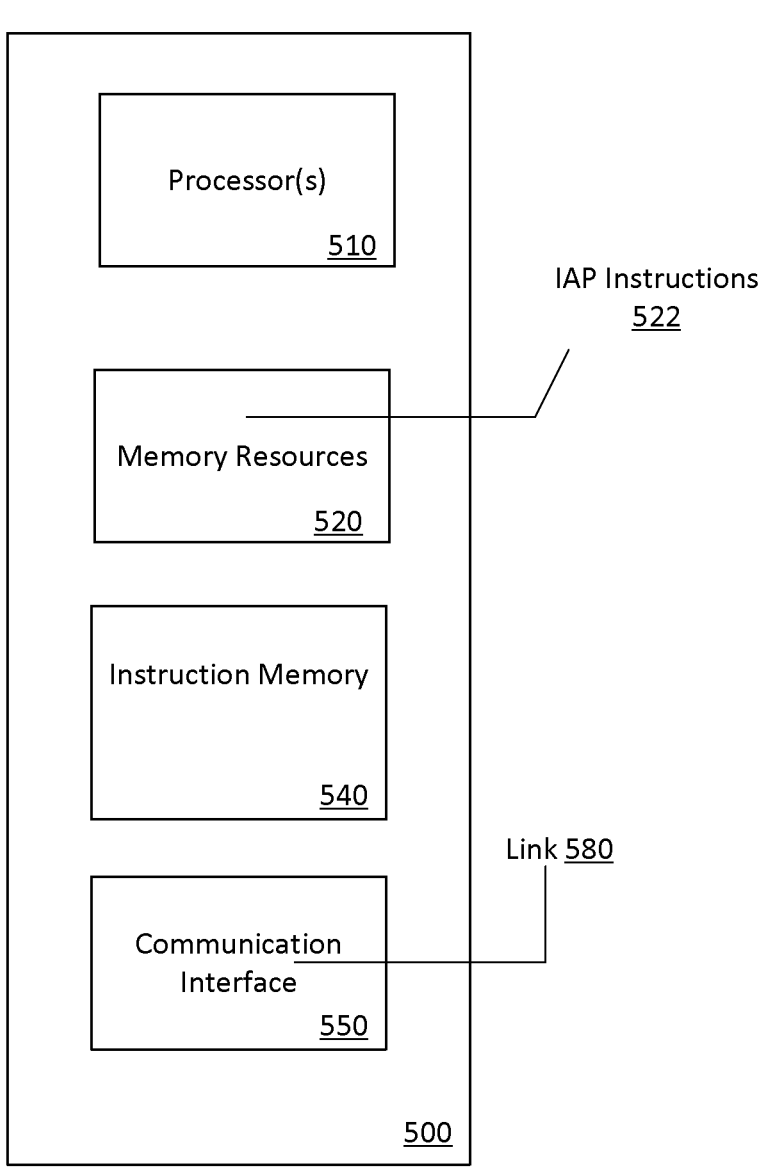
FIG. 5 illustrates a computer system on which one or more embodiments can be implemented.

FIG. 5 illustrates a computer system on which one or more embodiments can be implemented. A computer system 500 can be implemented on, for example, a server or combination of servers. For example, the computer system 500 may be implemented as the network computing system 150 of FIG. 1.

In one implementation, the computer system 500 includes processing resources 510, memory resources 520 (e.g., read-only memory (ROM) or random-access memory (RAM)), one or more instruction memory resources 540, and a communication interface 550. The computer system 500 includes at least one processor 510 for processing information stored with the memory resources 520, such as provided by a random-access memory (RAM) or other dynamic storage device, for storing information and instructions which are executable by the processor 510. The memory resources 520 may also be used to store temporary variables or other intermediate information during execution of instructions to be executed by the processor 510.

The communication interface 550 enables the computer system 500 to communicate with one or more user computing devices, over one or more networks (e.g., cellular network) through use of the network link 580 (wireless or a wire). Using the network link 580, the computer system 500 can communicate with one or more computing devices, specialized devices and modules, and/or one or more servers.

In examples, the processor 510 may execute service instructions 522, stored with the memory resources 520, in order to enable the network computing system to implement a network service of and operate as the network computing system 150 in examples described with FIG. 1.

The computer system 500 may also include additional memory resources ("instruction memory 540") for storing executable instruction sets ("IAP instructions 522") which are embedded with web-pages and other web resources, to enable user computing devices to implement functionality such as described with the IAP 100. In examples, the computer system 500 can communicate the IAP instructions 552 to computing devices of collaborators during a collaboration session, to enable each of the user devices 10, 12 to implement the IAP 100 and functionality described with examples.

As such, examples described herein are related to the use of the computer system 500 for implementing the techniques described herein. According to an aspect, techniques are performed by the computer system 500 in response to the processor 510 executing one or more sequences of one or more instructions contained in the memory 520. Such instructions may be read into the memory 520 from another machine-readable medium. Execution of the sequences of instructions contained in the memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 6:
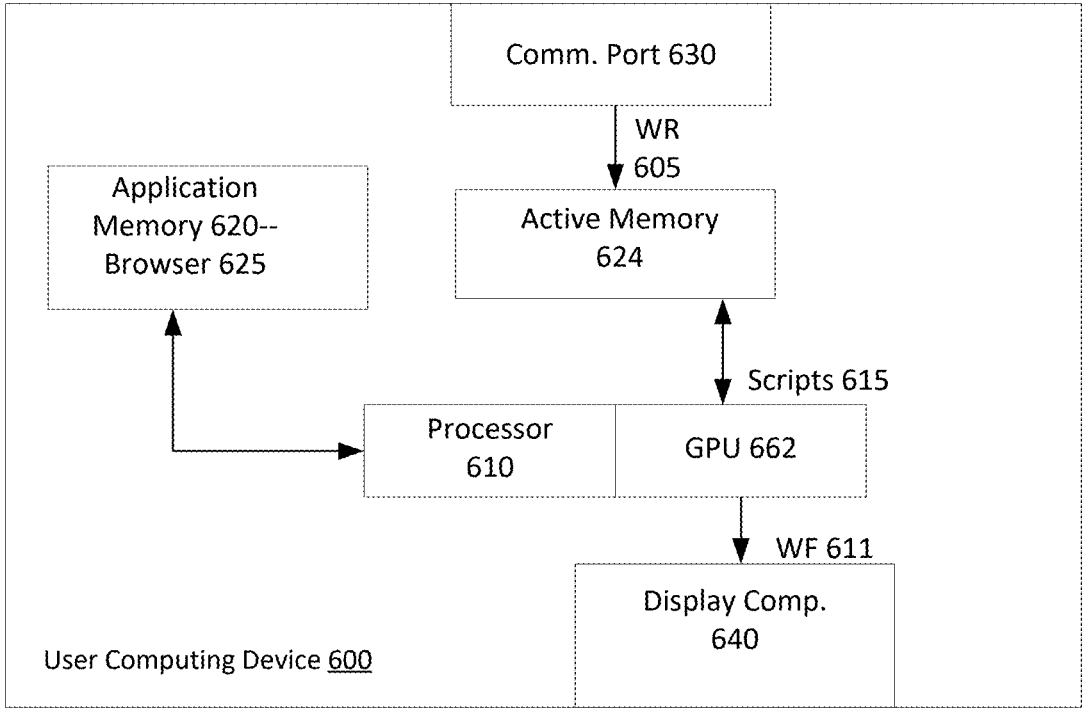
FIG. 6 illustrates a user computing device for use with one or more examples, as described.

FIG. 6 illustrates a user computing device for use with one or more examples, as described. In examples, a user computing device 600 can correspond to, for example, a work station, a desktop computer, a laptop or other computer system having graphics processing capabilities that are suitable for enabling renderings of design interfaces and graphic design work. In variations, the user computing device 600 can correspond to a mobile computing device, such as a smartphone, tablet computer, laptop computer, VR or AR headset device, and the like.

In examples, the computing device 600 includes a central or main processor 610, a graphics processing unit 612, memory resources 620, and one or more communication ports 630. The computing device 600 can use the main processor 610 and the memory resources 620 to store and launch a browser 625 or other web-based application. A user can operate the browser 625 to access a network site of the network service 152, using the communication port 630, where one or more web pages or other resources 605 for the network service 152 can be downloaded. The web resources 505 can be stored in the active memory 624 (cache).

As described by various examples, the processor 610 can detect and execute scripts and other logic which are embedded in the web resource in order to implement the IAP 100. In some of the examples, some of the scripts 615 which are embedded with the web resources 605 can include GPU accelerated logic that is executed directly by the GPU 612. The main processor 610 and the GPU can combine to render a workspace file 611 on a display component 640. The rendered design interface can include web content from the browser 625, as well as design interface content and functional elements generated by scripts and other logic embedded with the web resource 605. By including scripts 615 that are directly executable on the GPU 612, the logic embedded with the web resource 605 can better execute the IAP 100, as described with various examples.

Conclusion

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude having rights to such combinations.

What is claimed is:

1. A network computer system comprising:
a memory sub-system to store a set of instructions;
one or more processors that operate to execute a set of instructions, the set of operations causing the network computer system to perform operations comprising:
enabling a plurality of users to operate corresponding computing devices to collaborate on a shared workspace file, each user of the plurality of users accessing the shared workspace file at the same time to view and update the shared workspace file;
enabling at least a first user of the plurality of users to operate a first computing device and provide a first input to trigger a shared session, the first input identifying the first user as a presenter of the shared session;
upon the shared session being triggered, initiating a shared session joining countdown timer on a computing device of at least a subset of the plurality of the computing devices, the subset including one or more computing devices of the plurality of computing devices other than the first computing device, the shared session joining countdown timer being associated with a time window in which users of computing devices in the subset of the plurality of computing devices are allowed to join or decline to join the shared session;

enabling a corresponding user of each computing device of the subset to make a selection, while the shared session joining countdown timer is in progress, as to whether the computing device is to join or not join the shared session;
upon termination of any shared session joining countdown timer on a respective computing device of the subset where the corresponding user does not make the selection, implement a default selection for joining the shared session for that computing device; and
transmitting view data generated from a first computing device of the first user to each computing device of the subset that has joined the shared session, to cause each computing device to mirror a view state of the shared workspace file as rendered on the first computing device.

2. The network computer system of claim 1, wherein the operations further comprise:
causing the first computing device to generate and transmit view data to the network computer system, the view data including parametrized information defining the view state of the shared workspace file as rendered on the first computing device.

3. The network computer system of claim 2, wherein the parametrized information identifies one or more of (i) a portion of the shared workspace file that is rendered on the first computing device, (ii) a magnification level of a view of the rendered workspace file, and/or (iii) position information that identifies a location of a cursor on the first computing device.

4. The network computer system of claim 3, wherein enabling the corresponding user of each computing device of the subset to make the selection includes transmitting an invitation to each computing device of the subset, the invitation enabling the corresponding user of the computing device to join or not join the shared session.

5. The network computer system of claim 4, wherein in response to a second user declining to join the shared session, enabling the second user to continue to collaborate on the workspace while transmitting the view data to each computing device of the subset where the selection is made to join the shared session.

6. The network computer system of claim 1, wherein initiating the shared session countdown timer on the computing device of the subset of includes transmitting timer data to each computing device of the subset to cause the computing device to independently implement a countdown timer.

7. The network computer system of claim 1, wherein the operations include:
initiating a countdown timer on the first computing device, the countdown timer indicating a time when view data generated from the first computing device is transmitted to each computing device of the subset.

8. The network computer system of claim 1, wherein the operation include:
enabling at least a second user of the plurality of users to operate a second computing device to provide a second input to trigger a change in presenter for the shared session, and making the second user presenter by triggering a second computing device of the second user to generate view data, and retransmitting the view data to other computing devices of the subset and the first computing device.

9. The network computer system of claim 8, where the operations include:

retransmitting the view data generated from the second computing device to other computing devices of the subset and the first computing device.

10. The network computer system of claim 9, further comprising:

automatically transmitting shared session data of the second computing device to each computing device of the subset, so that a transition of the presenting computing device from the first computing device to the second computing device is seamless.

11. A computer-implemented method comprising:

enabling a plurality of users to operate corresponding computing devices to collaborate on a shared workspace file, each user of the plurality of users accessing the shared workspace file at the same time to view and update the shared workspace file;

enabling at least a first user of the plurality of users to operate a first computing device and provide a first input to trigger a shared session, the first input identifying the first user as a presenter of the shared session;

upon the shared session being triggered, initiating a shared session joining countdown timer on a computing device of at least a subset of the plurality of the computing devices, the subset including one or more computing devices of the plurality of computing devices other than the first computing device, the shared session joining countdown timer being associated with a time window in which users of computing devices in the subset of the plurality of computing devices are allowed to join or decline to join the shared session;

enabling a corresponding user of each computing device of the subset to make a selection, while the shared session joining countdown timer is in progress, as to whether the computing device is to join or not join the shared session;

upon termination of any shared session joining countdown timer on a respective computing device of the subset where the corresponding user does not make the selection, implement a default selection for joining the shared session for that computing device; and transmitting view data generated from a first computing device of the first user to each computing device of the subset that has joined the shared session, to cause each computing device to mirror a view state of the shared workspace file as rendered on the first computing device.

12. The method of claim 11, wherein the operations further comprise:

causing the first computing device to generate and transmit view data to a network computer system, the view data including parametrized information defining the view state of the shared workspace file as rendered on the first computing device.

13. The method of claim 12, wherein the parametrized information identifies one or more of (i) a portion of the shared workspace file that is rendered on the first computing device, (ii) a magnification level of a view of the rendered workspace file, and/or (iii) position information that identifies a location of a cursor on the first computing device.

14. The method of claim 13, wherein enabling the corresponding user of each computing device of the subset to make the selection includes transmitting an invitation to each computing device of the subset, the invitation enabling the corresponding user of the computing device to join or not join the shared session.

15. The method of claim 14, wherein in response to a second user declining to join the shared session, enabling the second user to continue to collaborate on the workspace while transmitting the view data to each computing device of the subset where the selection is made to join the shared session.

16. The method of claim 11, wherein initiating the shared session countdown timer on the computing device of the subset of includes transmitting timer data to each computing device of the subset to cause the computing device to independently implement a countdown timer.

17. The method of claim 11, wherein the operations include:

initiating a countdown timer on the first computing device, the countdown timer indicating a time when view data generated from the first computing device is transmitted to each computing device of the subset.

18. The method of claim 11, further comprising enabling at least a second user of the plurality of users to operate a second computing device to provide a second input to trigger a change in presenter for the shared session, and making the second user presenter by triggering a second computing device of the second user to generate view data, and retransmitting the view data to other computing devices of the subset and the first computing device.

19. The method of claim 18, further comprising:

retransmitting the view data generated from the second computing device to other computing device.

20. A non-transitory computer-readable medium that stores instructions, which when executed by one or more processors of a computer system, cause the computer system to perform operations comprising:

enabling a plurality of users to operate corresponding computing devices to collaborate on a shared workspace file, each user of the plurality of users accessing the shared workspace file at the same time to view and update the shared workspace file;

enabling at least a first user of the plurality of users to provide a first input to trigger a shared session, the first input identifying the first user as a presenter of the shared session;

upon the shared session being triggered, initiating a shared session joining countdown timer on a computing device of at least a subset of the plurality of the computing devices, the subset including one or more computing devices of the plurality of computing devices other than the first computing device, the shared session joining countdown timer being associated with a time window in which users of computing devices in the subset of the plurality of computing devices are allowed to join or decline to join the shared session;

enabling a corresponding user of each computing device of the subset to make a selection, while the shared session joining countdown timer is in progress, as to whether the computing device is to join or not join the shared session;

upon termination of any shared session joining countdown timer on a respective computing device of the subset where the corresponding user does not make the selection, implement a default selection for joining the shared session for that computing device; and transmitting view data generated from a first computing device of the first user to each computing device of the subset that has joined the shared session, to cause each computing device to mirror a view state of the shared workspace file as rendered on the first computing device.

* * * * *